United States Patent [19]
Saitoh et al.

[11] Patent Number: 5,602,950
[45] Date of Patent: Feb. 11, 1997

[54] OPTICAL STAR COUPLER

[75] Inventors: Tetsuya Saitoh; Hideo Shimizu; Takeshi Kobayashi, all of Tokyo, Japan

[73] Assignee: Fuji Electric Co., Ltd., Tokyo, Japan

[21] Appl. No.: 593,002

[22] Filed: Jan. 29, 1996

Related U.S. Application Data

[63] Continuation-in-part of Ser. No. 276,708, Jul. 18, 1994, abandoned.

[30] Foreign Application Priority Data

Jul. 19, 1993 [JP] Japan .................................. 5-118074
Jan. 27, 1995 [JP] Japan .................................. 7-012064

[51] Int. Cl.$^6$ .................................................. G02B 6/26
[52] U.S. Cl. .................................. 385/46; 385/33; 385/47
[58] Field of Search .................................. 385/33–37, 31, 385/46, 47, 901

[56] References Cited

U.S. PATENT DOCUMENTS 4,179,185 12/1979 Hawk .......................................... 385/46
5,412,506 5/1995 Feldblum et al. ........................ 385/33
5,477,384 12/1995 Nishikawa et al. ...................... 385/33

FOREIGN PATENT DOCUMENTS 0299159 1/1989 European Pat. Off. .
2456619 8/1976 Germany .
3723170 4/1989 Germany .
44250975 10/1994 Germany .

*Primary Examiner*—John Ngo
*Attorney, Agent, or Firm*—Brumbaugh, Graves, Donohue & Raymond

[57] ABSTRACT

A light beam from an optical fiber held by a waveguide support is guided to an illuminated region of a light-receiving section. A light beam from one light-deflecting device inside this region is reflected by a reflecting surface and passed as a light beam through a second light-deflecting device in another illuminated region to arrive at a second optical fiber. A light beam from the second optical fiber takes the reverse route to the foregoing route. In this way, various light-deflecting devices in one illuminated region are optically coupled to light-deflecting devices in other illuminated regions with substantially equal optical coupling strength. Further for equalizing light-beam intensities and minimizing optical dispersion loss, lenses may be included with the light-deflecting devices.

24 Claims, 8 Drawing Sheets

OPTICAL STAR COUPLER

This is a continuation-in-part of application Ser. No. 08/276,708, filed Jul. 18, 1994 now abandoned.

BACKGROUND OF THE INVENTION

The present invention relates to an optical star coupler for distributing and coupling light signals transmitted by waveguides such as optical fibers.

In order to build a communication network, using optical fibers or the like, optical star couplers for distributing a light signal among plural optical fibers and coupling light signals from plural optical fibers into one optical fiber are necessary. A known optical star coupler achieving this object is shown in FIG. 11.

This is fabricated by binding together plural optical fibers 101–105, melting the bundle at a high temperature to form a welded portion 110, and mounting a reflector 120 at the front end of the welded portion 110. As an example, a light beam going out of the optical fiber 103 passes through the welded portion 110, is reflected by the reflector 120, again passes through the welded portion 110, and is distributed to other optical fibers.

Generally, a light beam emerging from an optical fiber has an intensity distribution such that the intensity is high around the center of the beam, while decreasing toward the peripheral region of the beam. Therefore, in the optical star coupler shown in FIG. 11, different areas of a light beam which emerges from a single optical fiber get distributed to other optical fibers, and so the light signals cannot be distributed uniformly. A light beam emerging from an optical fiber is propagated so as to become diffused. In the optical star coupler constructed as shown in FIG. 11, the outgoing light beam is simply reflected by a reflector. Therefore, a large portion of the light beam does not reach other optical fibers and hence a large loss takes place.

SUMMARY OF THE INVENTION

The problem to be solved by the present invention is the ability to substantially distribute light signals in a uniform manner, or to reduce loss.

In order to solve this problem, the present invention provides an optical star coupler for coupling N incident light beams transmitted by N waveguides, where N is an integer greater than or equal to 3 and each of the N waveguides has an end surface or face for emitting an incident light beam. The optical star coupler includes means for supporting the ends of the N waveguides; light-receiving means for receiving the N incident light beams to thereby form N illuminated regions on the light-receiving means, where the light-receiving means includes, at each of the illuminated regions, N-1 deflector means for dividing and deflecting each incident light beam into N-1 deflected light beams; and means for reflecting the deflected light beams. Each of the deflector means is optically coupled by the reflector means to deflector means at a different illuminated region. Preferably, the optical coupling intensity or strength between the pairs of deflector means is substantially equal.

In one embodiment, the deflector means are transmission-type diffraction gratings, and the light-receiving means is positioned between the supporting means and the reflector means. The deflector means may focus the deflected light beams onto the reflector means, or may emit the deflected light beams as parallel or collimated beams.

In a second embodiment, the deflector means are reflectors such as mirrors or reflection-type diffraction gratings, the supporting means has an inside face which faces the light-receiving means, and the reflector means forms part of the inside face of the supporting means. As with the first embodiment, the deflector means may focus the deflected light beams onto the reflector means, or alternatively, emit the deflected light beams as collimated beams.

In the above-described arrangements, the waveguides connected to the waveguide support portion are preferably arranged so that the end faces of the waveguides are arranged in a rotationally symmetrical relation about a point on the waveguide support, with the several adjacent waveguides being regularly spaced from each other. Regions of illumination which correspond to the waveguides can be formed on the light-receiving section in such a way that the illuminated regions are also arranged in a rotationally symmetrical relation about a point on the light-receiving portion, with the several illuminated regions being regularly spaced from each other. Consequently, the apparatus is easy to design and fabricate. In each of the above described arrangements, the light-receiving section can be fabricated to have overlapping illuminated regions in which the deflector means are mounted. In this way, the whole light-receiving portion can contain fewer than N·(N-1) deflector means, which enables miniaturization.

Every deflector means in an illuminated region is always optically coupled to at least one deflector means in another illuminated region. Furthermore, the strength of the optical coupling between them is preferably made substantially equal. Hence, light signals can be uniformly distributed. Each deflector means within the light-receiving section is optically designed so that when an incident light beam is divided into a plurality of deflected beams, the deflected beams are focused on a desired reflecting surface, or are collimated. As a result, loss of optical energy is reduced.

In a preferred further embodiment, a light deflector is combined with a lens. This is in the interest of minimizing optical dispersion loss in the divided deflected beams. The lens corrects for chromatic aberration, the latter being due to wavelength dependency of the angle of deflection by a light deflector. A resulting star coupler requires less tuning and is more robust in use.

Advantageously further, an optical star coupler is provided with an optical material filling the space between light deflectors and the mirror, thereby integrating the light deflectors and the mirror into a unitary composite. This, too, reduces the need for tuning.

Advantageously with a unitary composite, an optical star coupler is provided with a polymeric covering or coating of the unitary composite, covering it except for the lenses. This is in the interest of protection against moisture and other environmental hazards.

DESCRIPTION OF PREFERRED EMBODIMENTS

Figure 1:
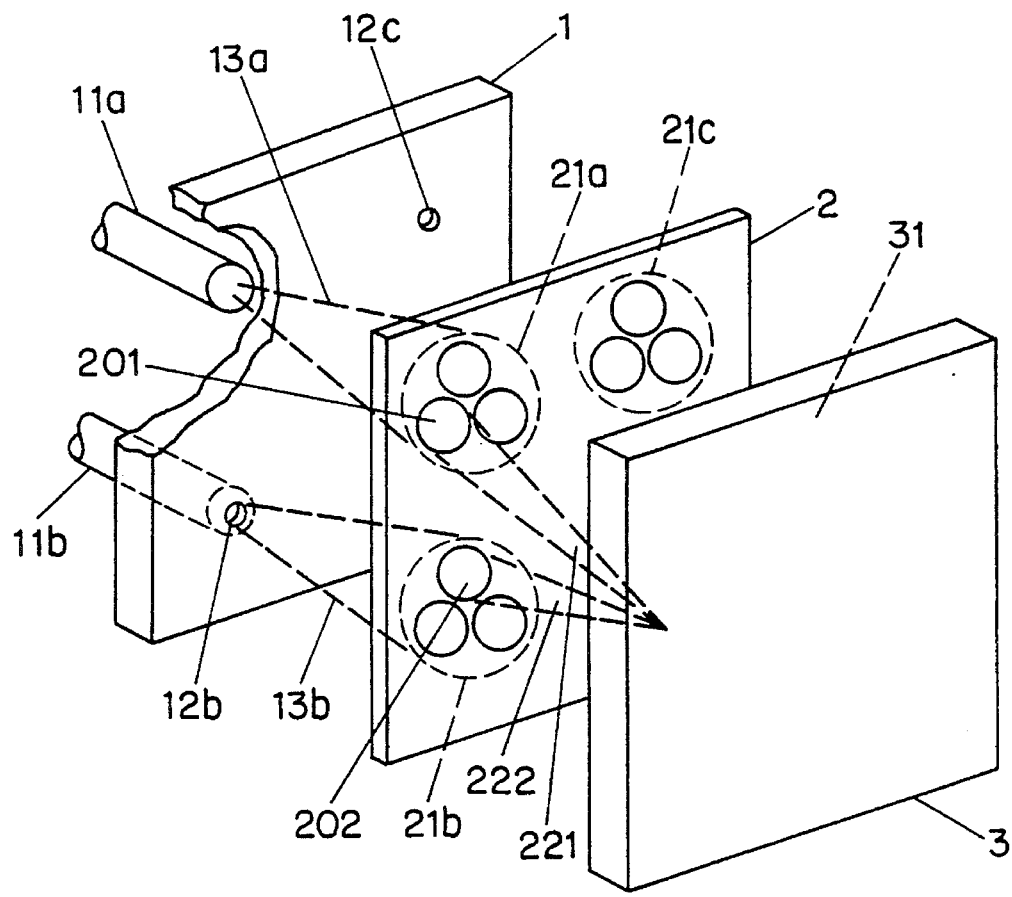
FIG. 1 is a schematic showing an example of a first embodiment of the invention.
Figure 2:
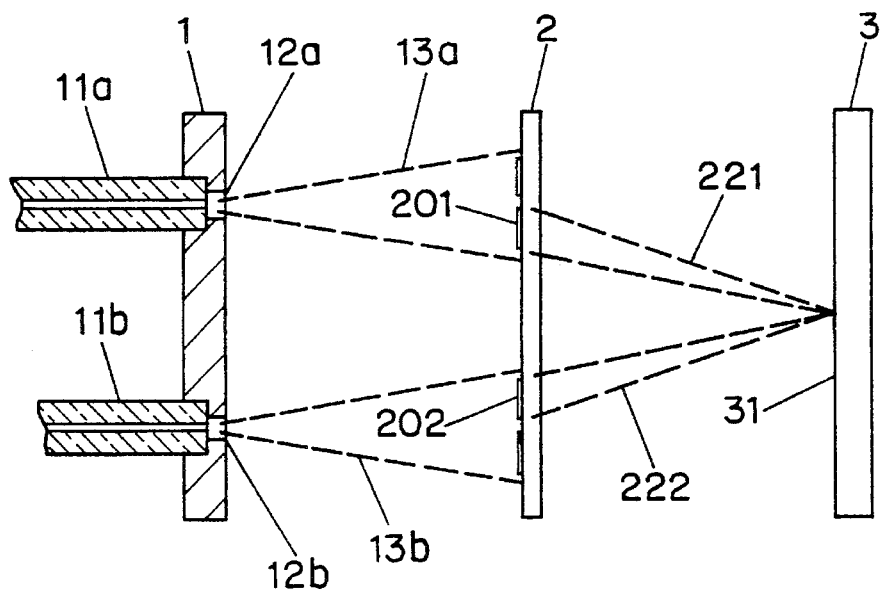
FIG. 2 is a view illustrating the operation of FIG. 1.

FIG. 1 is a schematic illustrating an example of the first embodiment of the present invention. FIG. 2 is a view illustrating the operation of FIG. 1.

In FIG. 1, there is shown waveguide support 1, light-deflecting section 2, and plane mirror 3. The waveguide support 1 is provided with openings 12a, 12b, 12c, and 12d (neither 12a nor 12d is shown). Optical fibers 11a, 11b, 11c, and 11d (neither 11c nor 11d is shown) are held in mounting holes formed in waveguide support 1. Thus, the end faces from which light beams in the optical fibers emerge are connected with the mounting holes. Light beams 13a, 13b, 13c, and 13d (neither 13c nor 13d is shown) emitted by optical fibers 11a, 11b, 11c, and 11d, respectively, pass through mounting holes 12a, 12b, 12c, and 12d, respectively, and impinge on illuminated regions 21a, 21b, 21c, and 21d (21d is not shown) of light-reflecting section 2.

Three light-deflecting devices, each consisting of a transmission-type diffraction grating are formed in each of the illuminated regions 21a, 21b, 21c, and 21d. For example, if light beam 13a from optical fiber 11a enters the illuminated region 21a, then light-deflecting device 201 existing in the illuminated region 21a deflects part of the beam by diffraction, causing the beam to emerge from the device in such a way that the deflected beam is brought into focus on the reflecting surface 31 of plane mirror 3. At this time, outgoing light beam 221 is reflected by reflecting surface 31 to impinge as light beam 222 on light-deflecting device 202 existing within the illuminated region 21b.

When light beam 13b from optical fiber 11b enters the illuminated region 21b, light-deflecting device 202 deflects part of the beam by diffraction and causes the beam to emerge from the device so that the deflected beam is brought into focus on reflecting surface 31 of plane mirror 3. At this time, outgoing light beam 222 is reflected by reflecting surface 31 to impinge as light beam 221 on light-deflecting device 201 existing within the illuminated region 21a.

Therefore, as shown in FIG. 2, part of light beam 13a emitted from optical fiber 11a is deflected by light-deflecting device 201, reflecting surface 31, and light-deflecting device 202 in succession, to thereby propagate in a direction opposite to the direction in which light beam 13b travels, and enter optical fiber 11b. Similarly, part of light beam 13b emitted from optical fiber 11b is deflected by light-deflecting device 202, reflecting surface 31, and light-deflecting device 201 in succession, to thereby propagate in a direction opposite to the direction in which light beam 13a travels and enter optical fiber 11a. Thus, it can be seen that the light signal from optical fiber 11a can be passed to optical fiber 11b and that the light signal from optical fiber 11b can be passed to optical fiber 11a.

The other two light-deflecting devices existing within illuminated region 21a (excluding light-deflecting device 201) couple with the light-deflecting devices located inside illuminated regions 21c and 21d, and act similarly to the above-described light-deflecting devices 201 and 202. Therefore, light signals can be transmitted between optical fibers 11a and 11c and between optical fibers 11a and 11d.

The description made thus far centers on the light-deflecting devices existing inside the illuminated region 21a. The light-deflecting devices within the other illuminated regions can perform similarly. Consequently, if a light signal is emitted from any optical fiber connected with waveguide support 1, it can be transmitted to all the other optical fibers connected to support 1.

Figure 3:
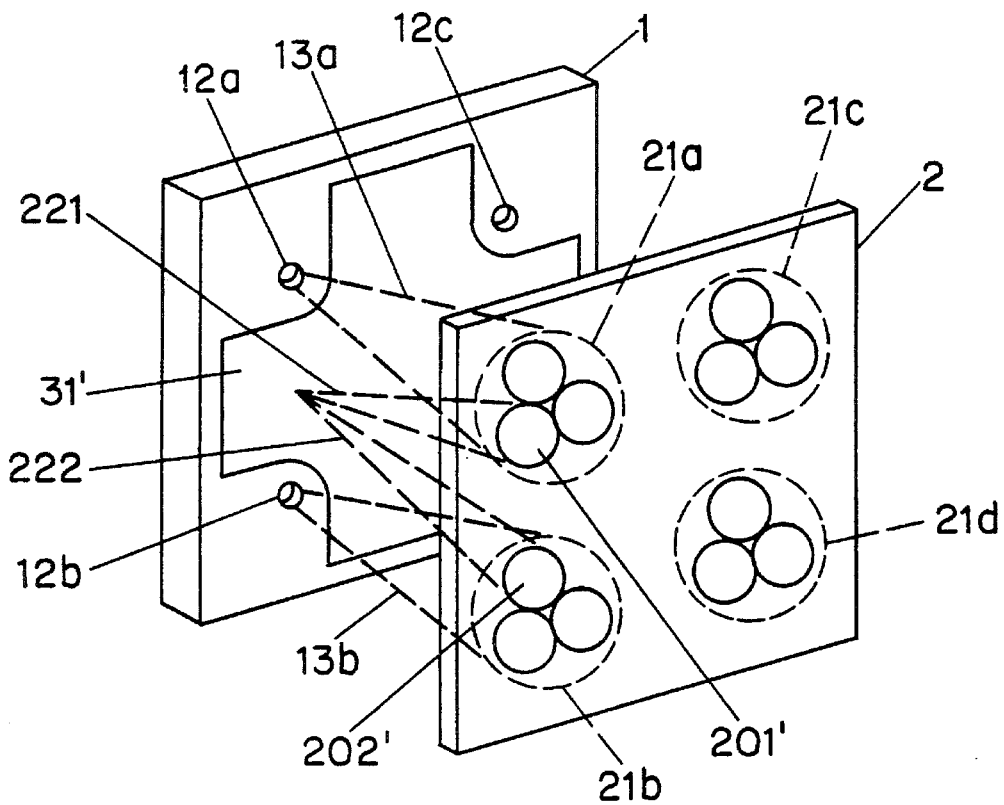
FIG. 3 is a schematic of an example of a second embodiment invention.
Figure 4:
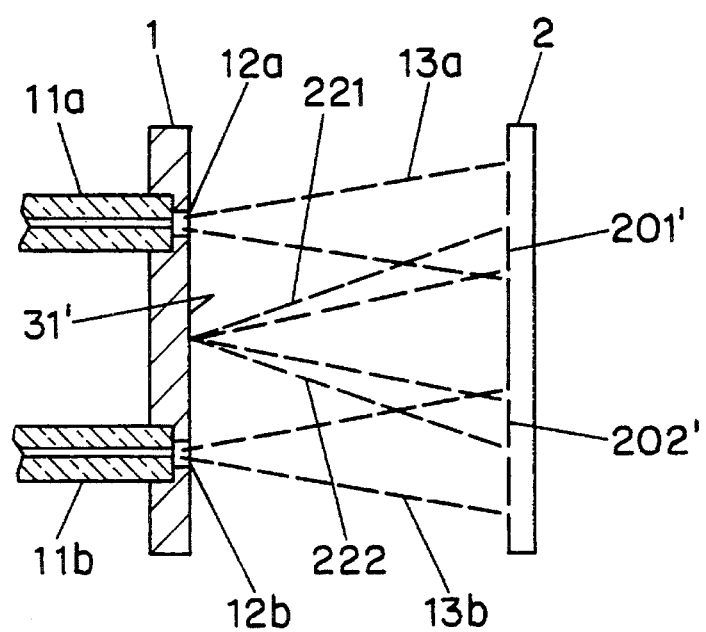
FIG. 4 is a view illustrating the operation of FIG. 3.

In FIGS. 1 and 2, the light-deflecting devices are transmission-type diffraction gratings. However, according to the second embodiment of the present invention the devices can also be of reflection type. FIG. 3 is a schematic illustrating an example of such an arrangement, and FIG. 4 is a view illustrating the operation of the arrangement shown in FIG. 3.

Optical fibers 11a, 11b, 11c, 11d (for 11a and 11b, refer to FIG. 4; 11c and 11d are not shown) connected to a waveguide support 1 emit light beams 13a, 13b, 13c, and 13d (only 13a and 13b are shown) and illuminate regions 21a, 21b, 21c, and 21d. Three light-deflecting devices (only 201' and 202' are shown), each consisting of a reflection-type diffraction grating are mounted in each of the illuminated regions 21a–21d.

For example, if light beam 13a from optical fiber 11a enters the illuminated region 21a, then light-deflecting device 201', existing within the illuminated region 21a, deflects part of the incident beam by diffraction and causes the beam to emerge from the device so that the beam is focused onto reflecting surface 31', of waveguide support 1, opposite to light-deflecting section 2. At this time, outgoing light beam 221 is reflected by reflecting surface 31' to impinge as light beam 222 on light-deflecting device 202' which exists inside the illuminated region 21b.

If light beam 13b from optical fiber 11b enters the illuminated region 21b, then light-deflecting device 202' deflects part of the beam by diffraction and causes the beam to emerge from the device so that the beam is focused onto reflecting surface 31'. At this time, deflected light beam 222 is reflected by reflecting surface 31' to impinge as light beam 221 on light-deflecting device 201' which exists inside the illuminated region 21a.

Therefore, as shown in FIG. 4, part of light beam 13a emitted by optical fiber 11a is deflected by light-deflecting device 201', reflecting surface 31', and light-deflecting device 202' in succession. Thereafter, the deflected beam propagates in a direction opposite to the direction of propagation of the light beam 13b emitted by optical fiber 11b and enters optical fiber 11b. Similarly, part of light beam 13b emerging from optical fiber 11b is deflected by light-deflecting device 202', light-reflecting surface 31', and light-deflecting device 201' in succession. This deflected beam then propagates in a direction opposite to the direction of propagation of light beam 13a emitted from optical fiber 11a to enter optical fiber 11a. Consequently, the light signal from optical fiber 11a can be transmitted to optical fiber 11b. Also, the light signal from optical fiber 11b can be transmitted to optical fiber 11a.

In the case of FIGS. 3 and 4, the foregoing focuses on the relation between the light-deflecting devices 201' and 202'. The same relation exists between other light-deflecting devices 203' and 204' (not shown). Accordingly, if a light signal is radiated from any optical fiber connected with waveguide support 1, then the signal can be transmitted to all the other optical fibers which are connected to support 1. In the embodiment of FIGS. 3 and 4, a mirror can be used as each light-deflecting device instead of a reflection-type diffraction grating.

Figure 5:
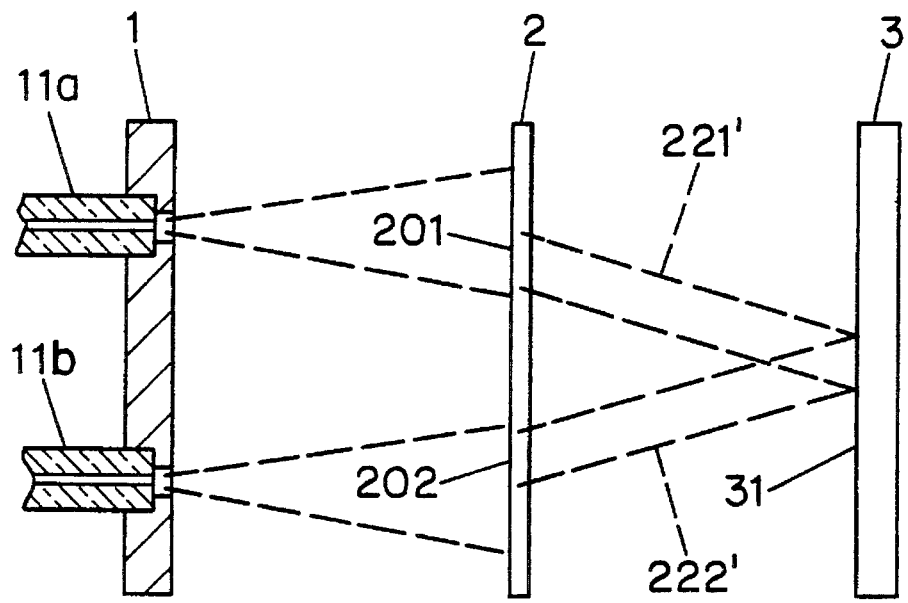
FIG. 5 is a schematic showing a modification of FIG. 1.
Figure 6:
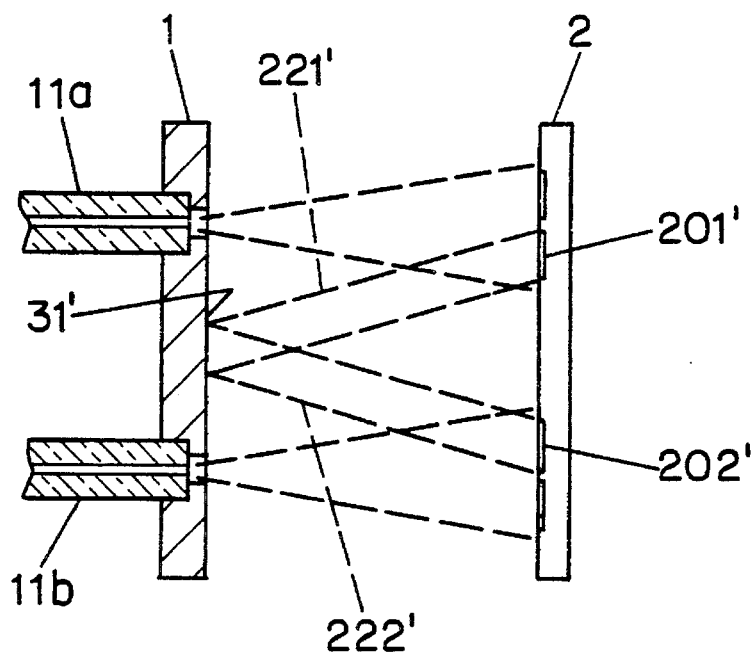
FIG. 6 is a schematic showing a modification of FIG. 3.

FIG. 5 is a schematic of a modification of the arrangement shown in FIGS. 1 and 2. FIG. 6 is a schematic of a modification of the arrangement shown in FIGS. 3 and 4.

Specifically, in FIGS. 1 and 2, a light beam transmitted between a light-deflecting device and the reflecting surface of the plane mirror is deflected by the light-deflecting device so that the beam is brought into focus on the reflecting surface. Alternatively, as shown in FIG. 5, the light beam is deflected by a light-deflecting device so that the light beam transmitted between the light-deflecting device and a plane mirror is a collimated beam. For example, the light beam transmitted between light-deflecting device 202 and reflecting surface 31 is a collimated beam 222'. Similarly, the arrangement shown in FIGS. 3 and 4 may be designed as shown in FIG. 6.

In the arrangements of FIGS. 1–6 described above, each light-deflecting device has a circular light-deflecting region of the same size. In each illuminated region containing three light-deflecting devices, each light-deflecting device is disposed in a rotationally symmetrical relation with the other light-deflecting devices in the same illuminated region with respect to the center of that illuminated region. The distance between the center of the illuminated region and each light-deflecting device is the same within every illuminated region. Since the spatial intensity distribution of the light beam emitted from each optical fiber shows a rotational symmetry, if the intensities of the light beams emitted by the optical fibers are the same during illumination of the light-deflecting devices, then the intensities of the light beams incident on the light-deflecting devices are the same.

Furthermore, every light-deflecting device is formed in a plane parallel to the reflecting surface of the plane mirror. Consequently, the distance from each light-deflecting device to the reflecting surface is the same. Therefore, a light beam incident on a given illuminated region can be branched into three deflected light beams having the same intensity by the three light-deflecting devices which reside within the illuminated region, which are then deflected. In addition, these deflected light beams are caused to enter a second set of light-deflecting devices which pair with the light-deflecting devices of the given illuminated region with the same coupling efficiency. Then, the beams are deflected by the second set of light-deflecting devices, and enter the optical fibers which can illuminate their respective light-deflecting devices. In consequence, the intensities of the light beams can be made substantially uniform.

Figure 7:
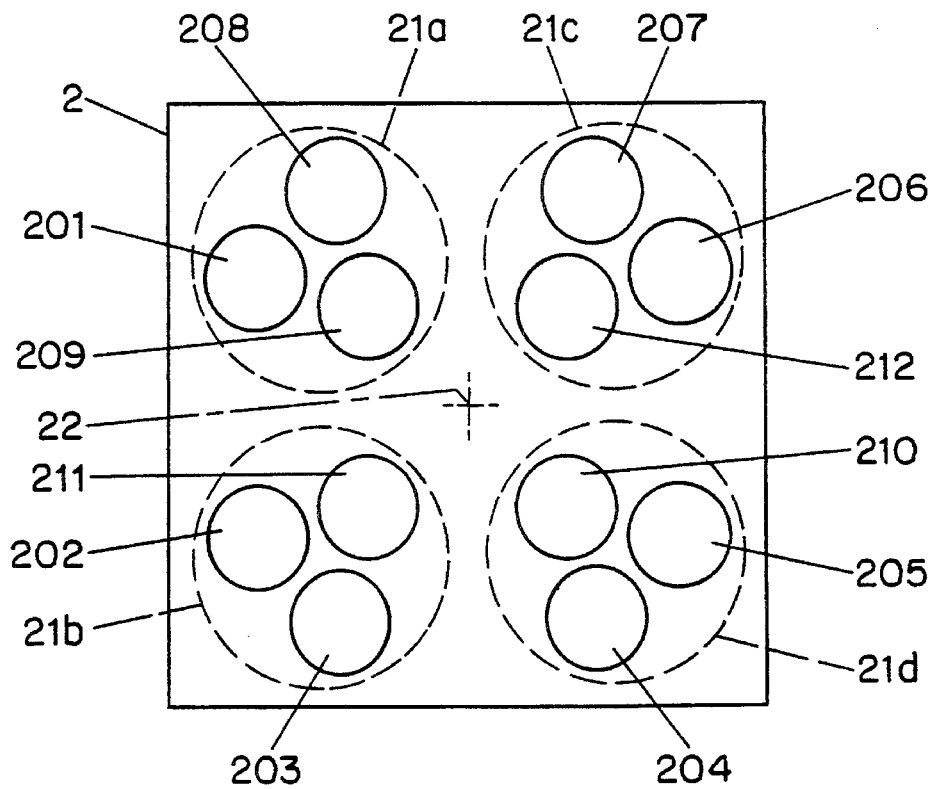
FIG. 7 is a schematic view of a specific example of a light-receiving section.

FIG. 7 is a schematic of a specific example of the light-deflecting section.

In this example, the illuminated regions 21a–21d exhibit a rotationally symmetrical relation with respect to the central axis 22 perpendicular to the plane of the sheet of this figure. The regions are so disposed that the distances between the adjacent illuminated regions are equal. Moreover, light-deflecting devices 201–215 are each disposed in a rotationally symmetrical relation with respect to the central axis 22 in each illuminated region.

Optical fibers emit light beams which impinge on the illuminated regions. Light signals are coupled between these optical fibers by the light-deflecting devices. Of these devices, 201 and 202 make a pair. Devices 203 and 204 make a pair. Devices 205 and 206 make a pair. Devices 207 and 208 make a pair. Devices 209 and 210 make a pair. Devices 211 and 212 make a pair. In this light-deflecting section 2, three light-deflecting devices of the same shape are arranged in a rotation symmetry with respect to the central axis 22 in each illuminated region. Consequently, the intensities of the light beams can be made substantially uniform.

Figure 8:
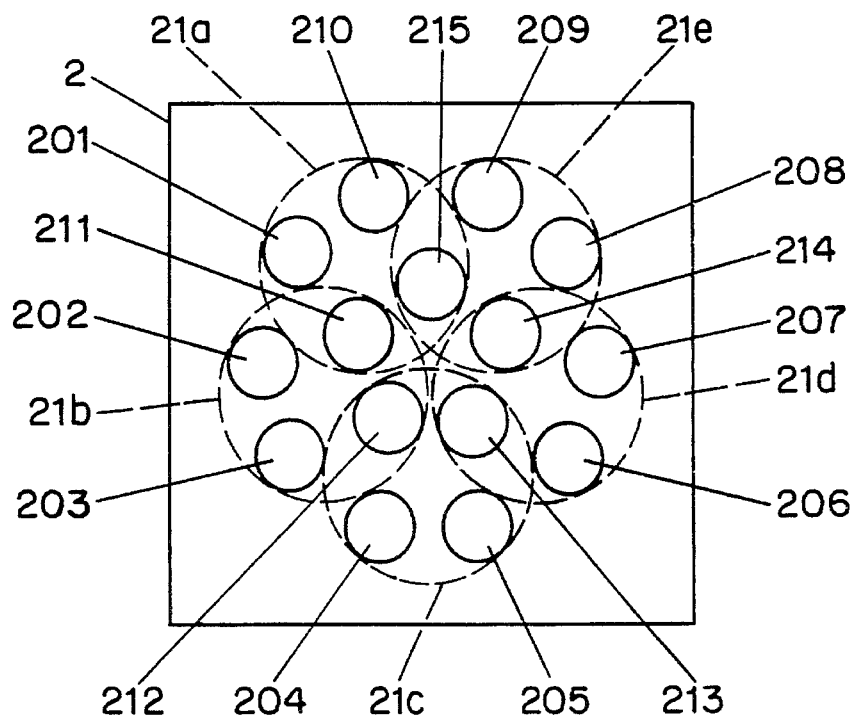
FIG. 8 is a schematic view of a second specific example of a light-receiving section.

FIG. 8 shows another specific example of the light-deflecting section. Five optical fibers emit light beams which illuminate five regions, respectively. In each illuminated region, four light-deflecting devices are mounted.

The illuminated region 21a contains light-deflecting devices 201, 210, 211, and 215. The illuminated region 21b contains light-deflecting devices 202, 203, 211, and 212. The illuminated region 21c contains light-deflecting devices 204, 205, 212, and 213. The illuminated region 21d contains light-deflecting devices 206, 207, 213, and 214. The illuminated region 21e contains light-deflecting devices 208, 209, 214, and 215.

In this arrangement, if illuminated region 21a is illuminated with a light beam emitted by optical fiber 11a (not shown), then light-deflecting device 211 will deflect part of the light beam to produce an outgoing beam. The outgoing beam is then reflected by the reflecting surface of a plane mirror (not shown) to enter light-deflecting device 212 where it is deflected again, and enters optical fiber 11c (not shown) which is connected so as to illuminate illuminated region 21c.

Similarly, if illuminated region 21b is illuminated with a light beam emitted by optical fiber 11b (not shown), then light-deflecting device 211 will deflect part of the light beam to produce an outgoing beam. The outgoing beam is then reflected by the reflecting surface of the plane mirror (not shown) to enter light-deflecting device 215 where it is deflected again, and enters optical fiber 11e (not shown) which is connected so as to illuminate illuminated region 21e.

Light-deflecting device 211 has deflecting characteristics which permit this optical system. That is, light-deflecting device 211 acts to transmit light signals through two paths which extend between optical fibers 11a and 11c and between optical fibers 11b and 11e, respectively. Similarly, light-deflecting devices 212, 213, 214, and 215 serve to transmit light signals through two paths between optical fibers 11b and 11d and between optical fibers 11a and 11c, respectively, through two paths between optical fibers 11c and 11e and between the optical fibers 11b and 11d, respectively, through two paths between optical fibers 11d and 11a and between optical fibers 11c and 11e, respectively, and through two paths between optical fibers 11e and 11b and between optical fibers 11d and 11a, respectively.

In this way, the illuminated regions overlap each other. Due to this fact and because the light-deflecting devices are contained in the overlapping regions, the size of the light-deflecting section can be made smaller.

Figure 9:
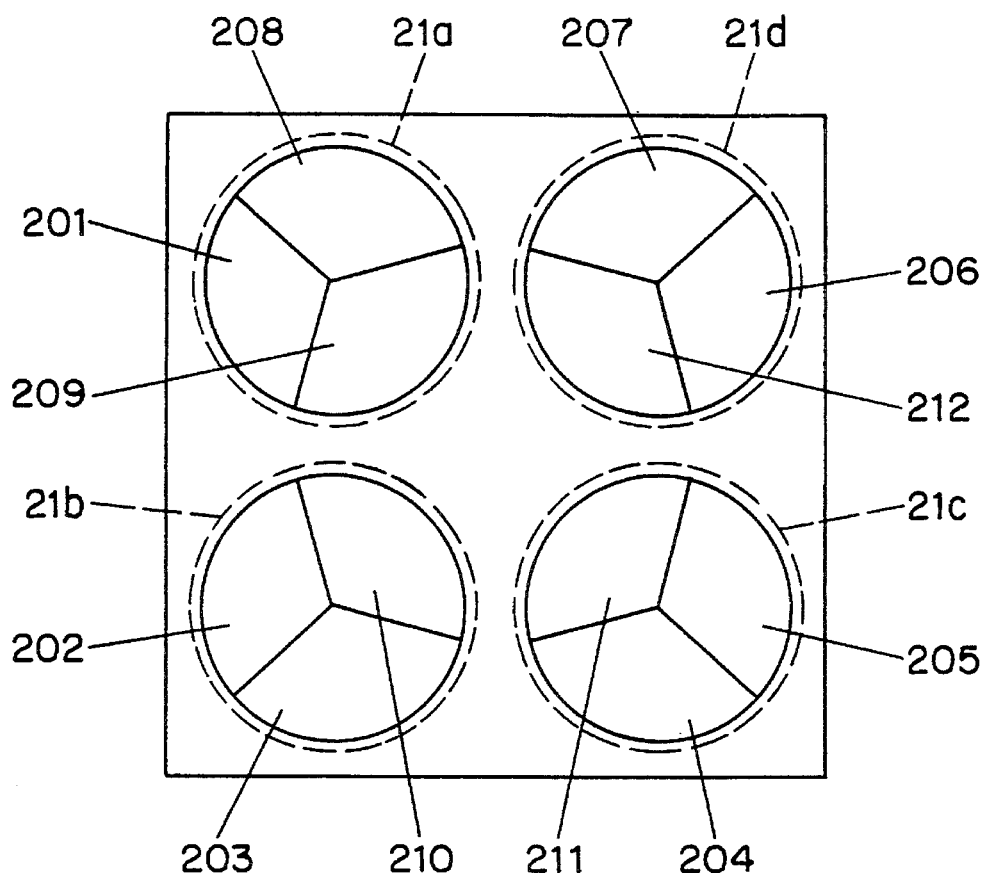
FIG. 9 is a schematic view of a modified example of the deflector means.

In the description made thus far, the light-deflecting region of the light-deflecting devices are circular and have the same size. However, the light-deflecting regions can be shaped into sectors as shown in FIG. 9, or take other forms.

Figure 10:
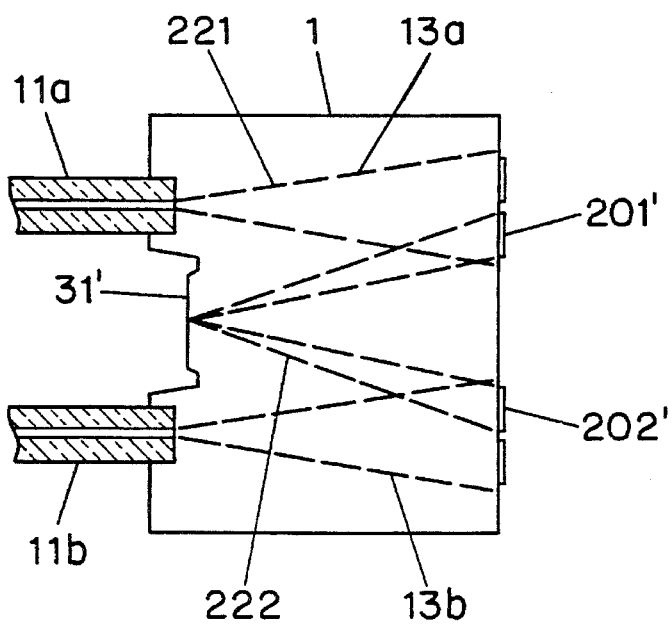
FIG. 10 is a schematic view of an integrally fabricated structure.
Figure 11:
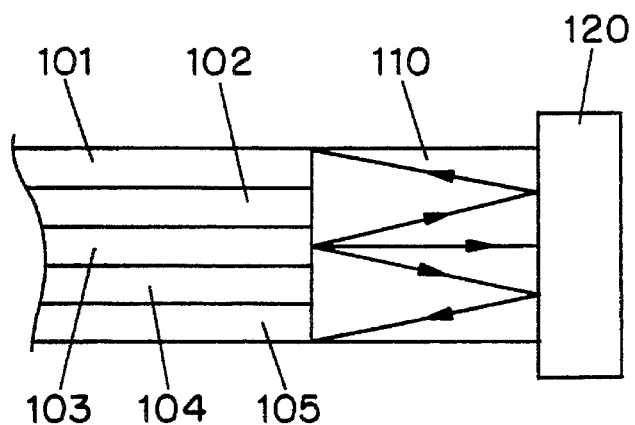
FIG. 11 is a schematic view of a prior art structure.

In the arrangements described above, the waveguide support, the light-receiving section and the plane mirror require at least two separate components. However, as shown in FIG. 10, the waveguide support, the light-receiving section, and the plane mirror can be integrally fabricated out of an optically transparent material. The light-deflecting devices and the reflecting surface can be formed on the surface.

Figure 12:
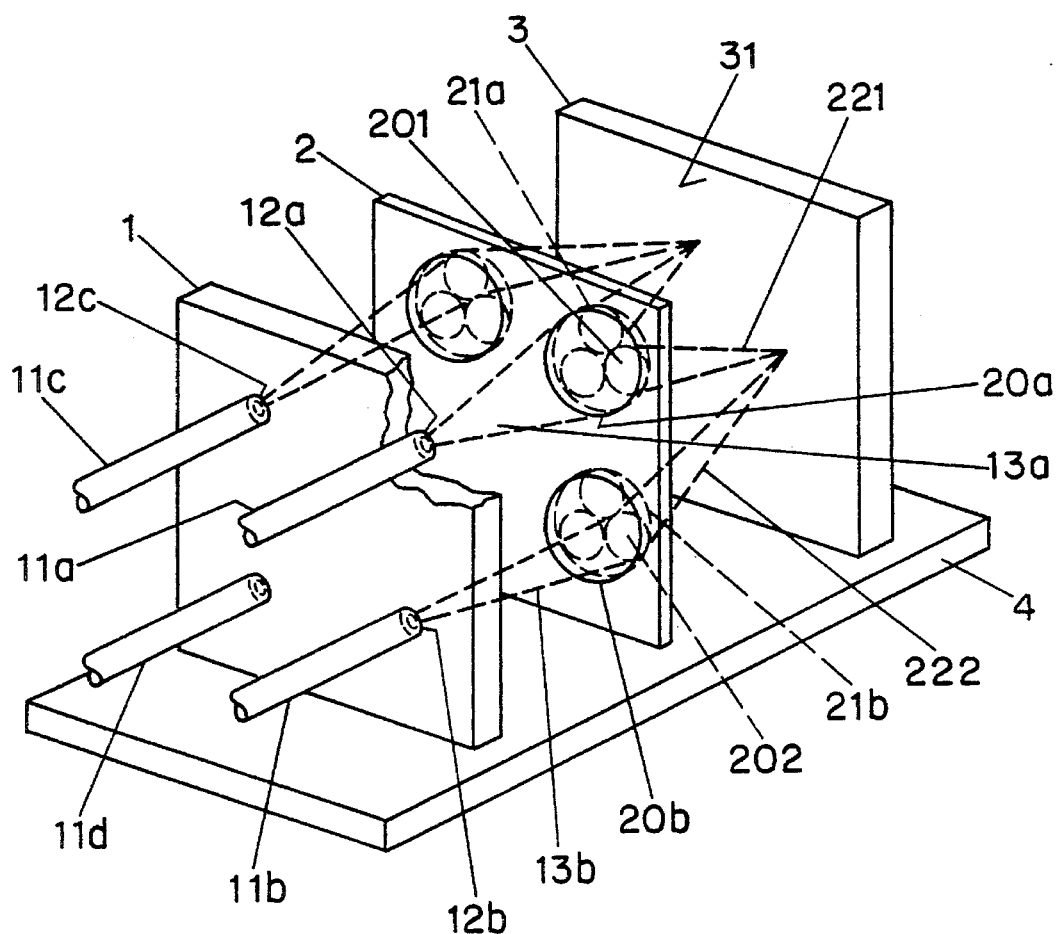
FIG. 12 is a perspective view of a preferred further embodiment of the invention, comprising lenses.
Figure 13:
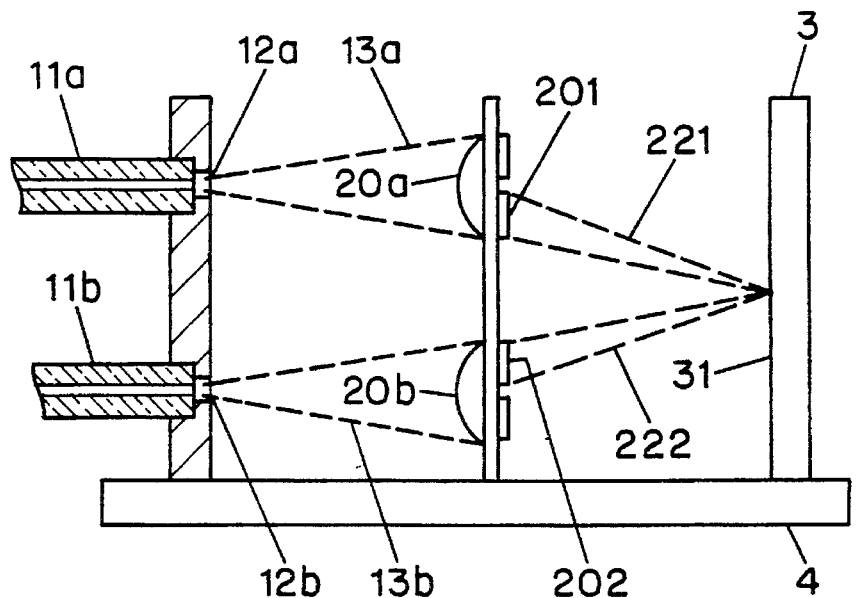
FIG. 13 is a side-view schematic in correspondence with FIG. 12.

In FIGS. 12 and 13, parts similar to those in FIGS. 1 and 2 are designated by the same reference numerals. Certain reference numerals which are omitted in the figures are readily inferred in view of the description above. A waveguide support 1 has openings 12a, 12b, 12c and 12d. Optical fibers 11a, 11b, 11c and 11d are fixed to the waveguide support 1 with their end faces connected to the respective openings 12a, 12b, 12c and 12d.

Optical beams 13a, 13b, 13c and 13d radiated from the respective optical fibers 11a, 11b, 11c and 11d impinge through the openings 12a, 12b, 12c and 12d on respective lenses 20a, 20b, 20c and 20d of a light deflector 2. The light beams having passed through the lenses 20a, 20b, 20c and 20d illuminate respective areas 21a, 21b, 21c and 21d.

Three deflector elements, each consisting of a transmission-type diffraction grating, are disposed on each of the illuminated areas 21a, 21b, 21c and 21d. For example, a deflector element 201 located in the illuminated area 21a deflects by diffraction of a part of the light beam 13a that impinges through the lens 20a on the illuminated area 21a and focuses the deflected part of the light beam 13a on a reflection plane 31 of a plane mirror 3. The light beam 221 radiated from the deflector element 201 is reflected on the reflection plane 31 of the plane mirror 3 as a reflected beam 222 that impinges on the deflector element 202 disposed in the illuminated area 21b.

The deflector element 202 deflects by diffraction of a part of the light beam 13b that impinges through the lens 20b on the illuminated area 21b and focuses the deflected part of the light beam 13b on the reflection plane 31 of the plane mirror 3. The light beam 222 radiated from the deflector element 202 is reflected on the reflection plane 31 of the plane mirror 3 to be a reflected beam 221 that impinges on the deflector element 201 disposed in the illuminated area 21a. Thus, bidirectional communication is facilitated between the optical fibers 11a and 11b.

The other two deflector elements disposed in the illuminated area 21a are paired with two deflector elements disposed in the illuminated areas 21c and 21d, respectively, to be provided with the same function that a pair of the light deflectors 201 and 202 exhibits. Thus, transmission and reception of optical signals between the optical fiber 11a and the optical fiber 11c or 11d are facilitated. The other light deflectors disposed in any illuminated areas other than the illuminated area 21a have a similar function.

If the light beam exhibits substantially no wavelength dispersion like a laser beam, for example, the area ratios of the deflector elements are set based on the designed respective deflection angles for the deflected light beams so as to equalize the optical losses of the deflected beams. But if the light beam exhibits wavelength dispersion like a beam from a light emitting diode, for example, the lenses 20 serve for suppressing the optical loss dispersion caused by the chromatic aberration. For techniques which can be used in making lenses in this embodiment, see, e.g., U.S. Pat. No. 5,412,506, issued May 2, 1995 to A. Y. Feldblum et al.

Figure 14:
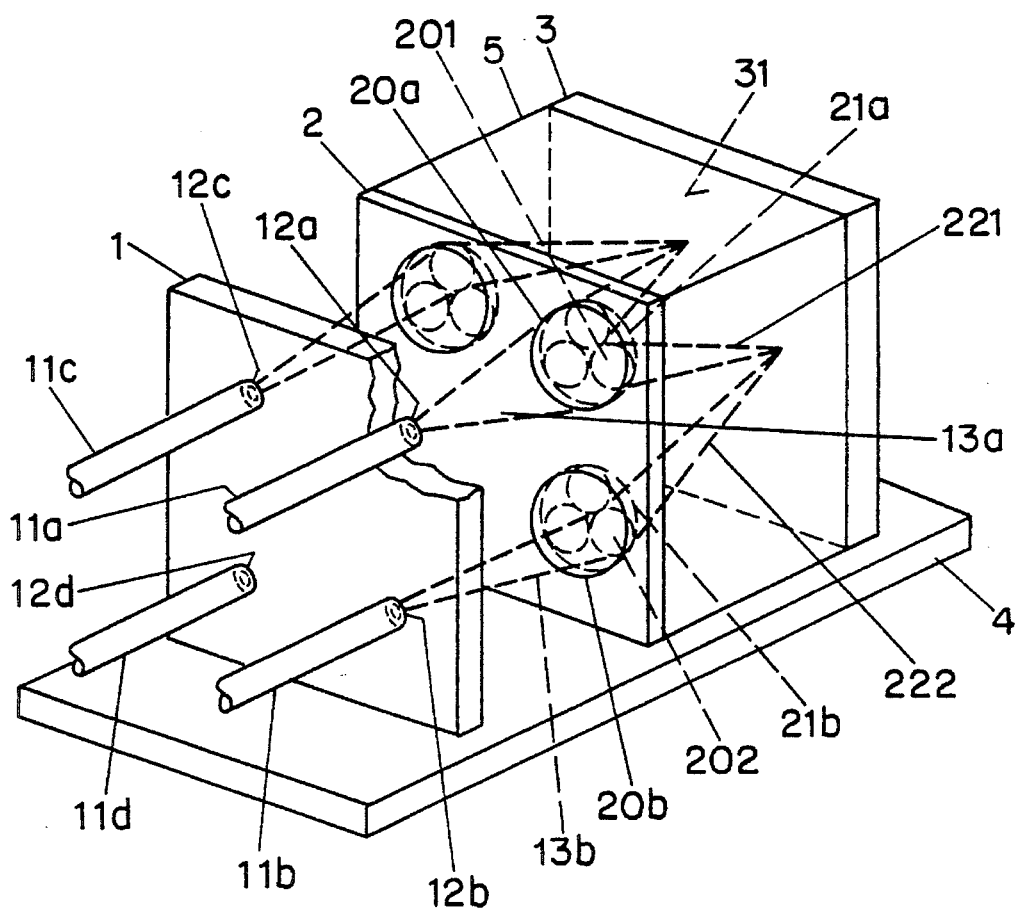
FIG. 14 is a perspective view of a preferred further embodiment of the invention, comprising a unitary composite.

In FIG. 14, parts similar to those in FIGS. 12 and 13 are designated by the same reference numerals. In this embodiment, a space between the light deflector 2 and the plane mirror 3 is filled with an optically transparent material 5 such as glass or plastic or the like, and the light deflector 2 and the plane mirror 3 are integrated into a unitary composite. The length of the optical material 5, i.e. the spacing between the light deflector 2 and the plane mirror 3, is determined by the focal length of the lenses 20, the optical parameters of the deflector elements, etc., and optical tuning of the optical star coupler is simplified on account of its unitary structure. Other structural features are as in FIGS. 12 and 13.

Figure 15:
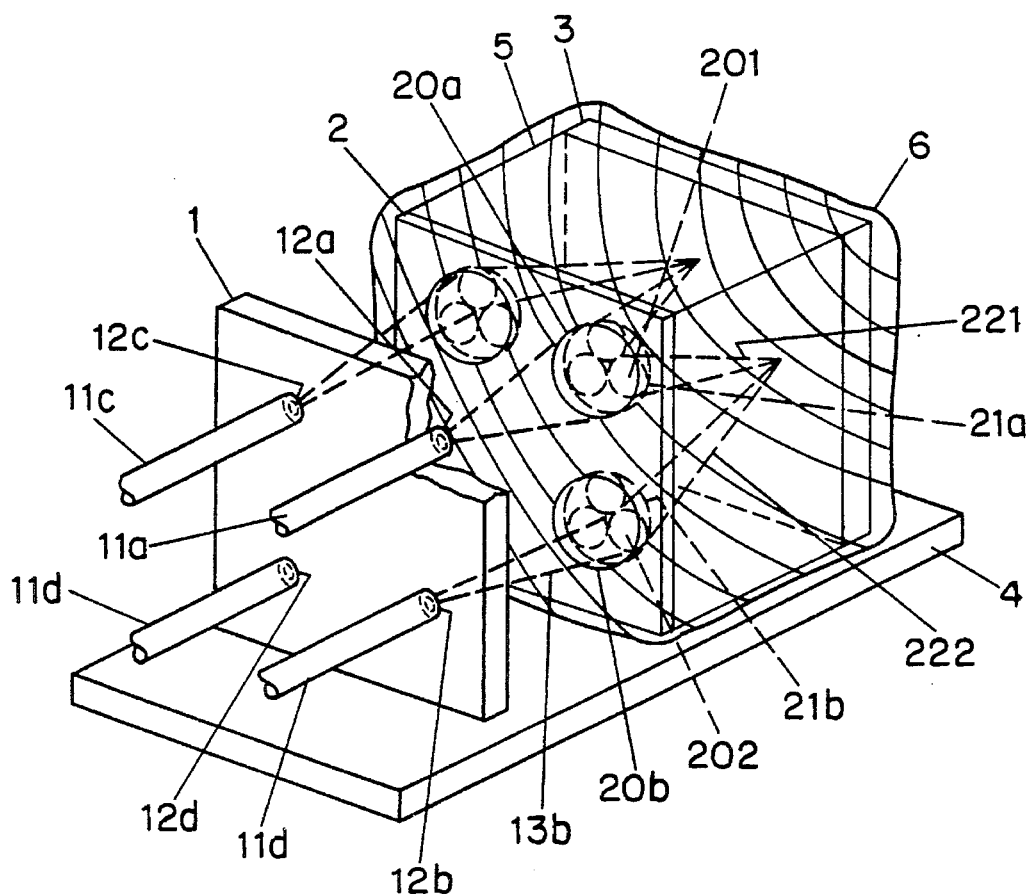
FIG. 15 is a perspective view of a preferred further embodiment of the invention, comprising a protective coating.

In FIG. 15, parts similar to those in FIGS. 12–14 are designated by the same reference numerals. In this embodiment, the light deflector 2 and the plane mirror 3 are integrated into a unitary composite with an optically transparent material 5 such as glass or plastic or the like interposed between the light deflector 2 and the plane mirror 3. The light deflector 2, the plane mirror 3 and the optical material 5 except the lenses 20 are covered, e.g., with a polymer material 6 including a silicone resin. By covering with the polymer material 6, a moisture-proof optical deflector is provided, with impoved resistance to environmental hazards. Other structural features are as in FIGS. 12–14.

Preferably, the illuminated areas are wide enough to facilitate mounting and optically orienting the respective deflector elements. Preferably also, the light beams radiated from the optical fibers diverge so that the light beams may impinge on the entire respective illuminated areas. Accordingly, for obtaining sufficiently expanded light beams on the illuminated areas, it is not recommendable and may even be detrimental to fill the space between the waveguide support and the light deflector. For the same reason, it is preferable not to cover the lenses disposed in front of the illuminated areas with a polymer material.

Figure 16:
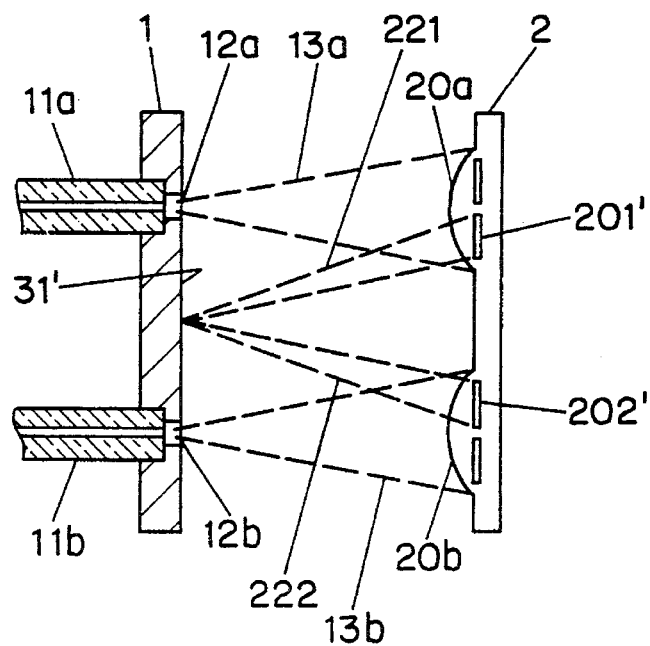
FIG. 16 is a schematic of a preferred further embodiment of the invention, comprising reflecting deflector elements.

In FIG. 16, a reflection-type diffraction grating is used as a deflector element. Lenses 20a and 20b facilitate correction for aberration. Reference numerals 201' and 202' designate light deflectors, and reference numeral 31' a reflection plane of the plane mirror.

It can be expected that the present invention produces the following effects:

(1) Every light-deflecting device in an illuminated region is always optically coupled to at least one other light-deflecting device in the remaining illuminated regions. Furthermore, the optical coupling strengths between them are made substantially equal. Hence, light signals can be uniformly distributed.

(2) Each light-deflecting device of the light-receiving portion is optically designed so that when an incident light beam is branched and deflected into plural deflected beams, the device brings a part of each deflected beam into focus on a desired reflecting surface, or alternatively, collimates the beam. As a result, the loss of the optical energy can be reduced.

(3) The end faces of the waveguides connected to the waveguide support are arranged in a rotationally symmetrical relation so that the adjacent waveguides are regularly spaced from each other. In the light-receiving section, the illuminated regions corresponding to the waveguides are arranged in a rotational symmetrical relation so that the adjacent regions are equally spaced from each other. Consequently, the apparatus is easy to design and fabricate.

(4) The light-receiving section can be fabricated to have overlapping illuminated regions. Light-deflecting devices are mounted in the illuminated regions. The whole light-receiving section can thus contain fewer than N·(N-1) light-deflecting devices where N is an integer equal to the number of waveguides connected to the waveguide support. This permits miniaturization of the light-receiving section.

We claim:

1. An optical star coupler for coupling N incident light beams transmitted by N waveguides for N >2, each of the waveguides having an end with an end face for emitting one of the incident light beams, comprising:

(a) support means for supporting the ends of the waveguides;

(b) light-receiving means for receiving the incident light beams to thereby form N illuminated regions on the light-receiving means, the light-receiving means including, at each of the illuminated regions, N-1 deflector means for dividing and deflecting each one of the respective incident light beams into N-1 deflected light beams;

(c) reflector means for reflecting each one of the deflected light beams as a respective reflected light beam such that each one of the reflected light beams is optically coupled to one of the deflector means of one of the illuminated regions different from the illuminated region from which the respective deflected light beam originated.

2. The optical star coupler according to claim 1, wherein optical coupling strength between pairs of deflector means is substantially equal.

3. The optical star coupler according to claim 1, wherein the deflector means comprise transmission-type diffraction gratings, and the light-receiving means is positioned between the supporting means and the reflector means.

4. The optical star coupler according to claim 3, wherein the deflector means focus the deflected light beams onto the reflector means.

5. The optical star coupler according to claim 3, wherein the deflector means emit the deflected light beams as collimated beams.

6. The optical star coupler according to claim 1, wherein the deflector means comprise reflectors, the supporting means having an inside face facing the light-receiving means, wherein the reflector means forms part of the inside face of the supporting means.

7. The optical star coupler according to claim 6, wherein the reflectors are reflection-type diffraction gratings.

8. The optical star coupler according to claim 6, wherein the reflectors are mirrors.

9. The optical star coupler according to claim 6, wherein the deflector means focus the deflected light beams onto the reflector means.

10. The optical star coupler according to claim 6, wherein the deflector means emit the deflected light beams as collimated beams.

11. The optical star coupler according to claim 6, wherein the supporting means and the light-receiving means are integrally fabricated from optically transparent material.

12. The optical star coupler according to claim 1, wherein the end faces of the N waveguides are arranged in a rotationally symmetrical relation about a point on the waveguide support and the N illuminated regions on the light-receiving means are arranged in a rotationally symmetrical relation about a point on the light-receiving means.

13. The optical star coupler according to claim 12, wherein for each illuminated region, the N-1 deflector means are arranged in a rotationally symmetrical relation about a central point of the illuminated region.

14. The optical star coupler according to claim 13, wherein the deflector means include circular light-deflecting regions.

15. The optical star coupler according to claim 13, wherein the deflector means include sector-shaped light-deflecting regions.

16. The optical star coupler according to claim 13, wherein N=4.

17. The optical star coupler according to claim 13, wherein at least one of the deflector means associated with any illuminated region is also associated with a different illuminated region, so that the light-receiving means includes fewer than N·(N-1) deflector means.

18. The optical star coupler according to claim 17, wherein N=5 and two of the deflector means associated with any illuminated region are also associated with different illuminated regions, so that the light-receiving means includes 15 deflector means.

19. The optical star coupler according to claim 1, wherein the reflector means is a plane mirror.

20. The optical star coupler according to claim 1, wherein at least one of the deflector means comprises a lens for correction of aberration.

21. The optical star coupler according to claim 1, further comprising a transparent material between the light-receiving means and the reflector means, so that the light-receiving means, the transparent material and the reflector means form a unitary composite.

22. The optical star coupler according to claim 21, wherein at least a portion of a surface of the unitary composite is covered with a protective coating.

23. The optical star coupler according to claim 22, wherein the protective coating is polymeric.

24. The optical star coupler according to claim 22, wherein the protective coating does not cover the deflector means.

* * * * *

UNITED STATES PATENT AND TRADEMARK OFFICE
CERTIFICATE OF CORRECTION

PATENT NO. : 5,602,950

DATED : February 11, 1997

INVENTOR(S) : Saitoh et al.

It is certified that error appears in the above-identified patent and that said Letters Patent is hereby corrected as shown below:

Title Page, second column, under "44250975"

add --OTHER PUBLICATIONS
        Patent Abstracts of Japan, P-384 August 31,
        1985, Vol. 9, No. 214, (60-73603)--.

Signed and Sealed this

Twenty-fifth Day of November, 1997

Attest:

BRUCE LEHMAN

Attesting Officer      Commissioner of Patents and Trademarks